2,968,614

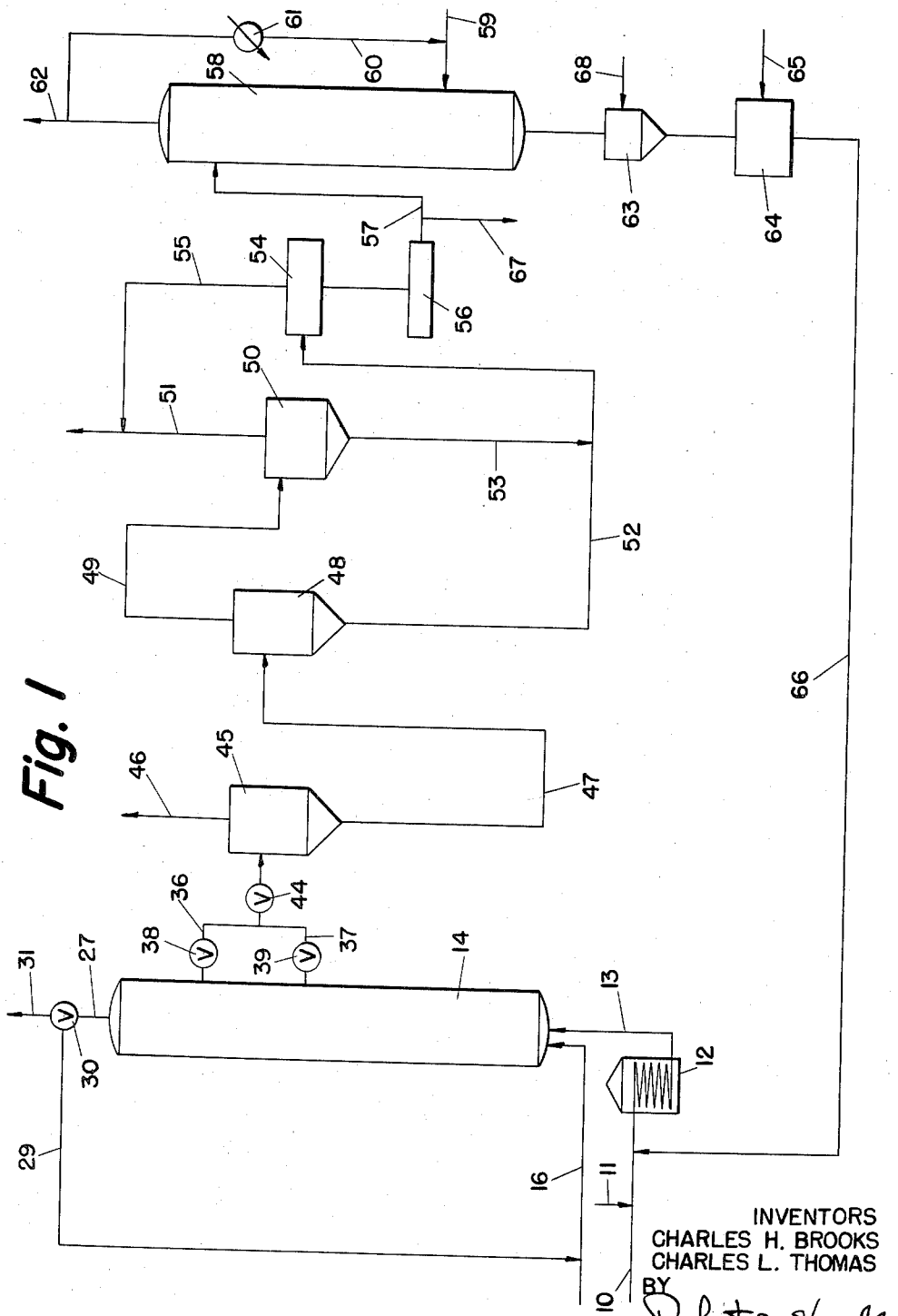
Fig. I
INVENTORS
CHARLES H. BROOKS
CHARLES L. THOMAS
BY
ATTORNEY

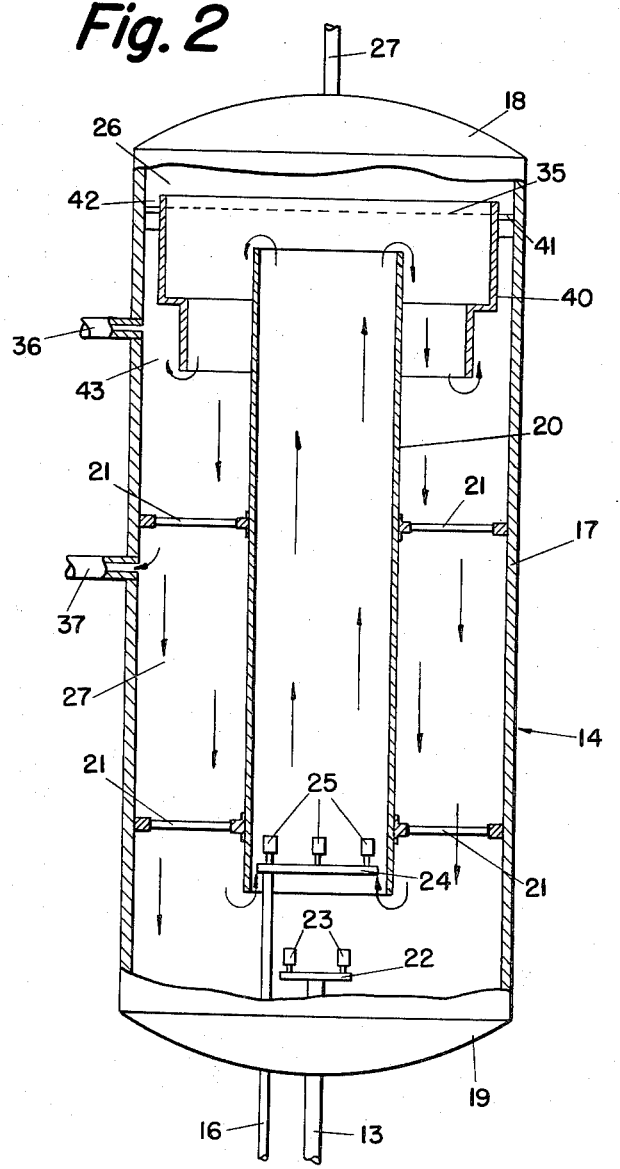

Patented Jan. 17, 1961

2,968,614

LIQUID PHASE HYDROGENATION OF PETROLEUM FRACTIONS

Charles H. Brooks and Charles L. Thomas, Swarthmore, Pa., assignors to Sun Oil Company, Philadelphia, Pa., a corporation of New Jersey Filed July 3, 1957, Ser. No. 669,721

3 Claims. (Cl. 208—264)

This invention relates to a process and apparatus for conducting chemical reactions, and more particularly to a continuous liquid phase process for catalytically hydrodesulfurizing or hydrocracking heavy petroleum fractions.

Hydrogenation of petroleum fractions to reduce the sulfur content or to reduce the average molecular weight of the fraction is well known to the art. In the treatment of lower boiling hydrocarbons, such as naphthas and gas oils, the hydrotreating may be done in vapor phase, so that the fluidized catalyst technique may be used, with the advantage that catalyst may be continuously withdrawn from the reactor, regenerated, and returned to the reactor to maintain a catalyst of constant equilibrium activity therein. In addition, there is no limit to the mol ratio of hydrogen to hydrocarbons in the feed to the reactor, so that a sufficiently high partial pressure of hydrogen may be used to substantially inhibit coking of the catalyst. Residual petroleum fractions, on the other hand, cannot be hydrogenated in vapor phase, since they cannot be vaporized at the high pressures required for hydrogenation. Hydrogenation of these fractions has heretofore been practiced commercially by contact of the feed and hydrogen with a fixed bed of catalyst. In such processes the activity of the catalyst will gradually decline, so that uniform quality of the product cannot be maintained. Furthermore, the unit must be shut down periodically in order to regenerate the catalyst, so that a truly continuous process is impossible.

Proposals have heretofore been made for adapting the fluidized technique to liquid phase hydrogenation processes, but these proposals have had inherent defects which have so far prevented them from being put into commercial practice. Harper et al. in U.S. Patent No. 2,706,167 proposed a process in which the catalyst is maintained in a state of hindered settlement in the bottom portion of a reactor. Treated oil, free from catalyst, is recovered from the top of the reactor, while deactivated catalyst is continuously removed for regeneration from the lower portion of the reactor. This process suffers from the defect that the flow of hydrogen through the reactor must be low enough to permit settling of the catalyst in the upper portion of the vessel, so that a high mol ratio of hydrogen to hydrocarbons in the reactor is not possible, with resultant rapid formation of coke on the catalyst, due to purely thermal reactions, and with the necessity for large catalyst regeneration facilities. Joyce in U.S. Patent No. 2,700,015 discloses a process in which oil, catalyst, and a hydrogen-containing gas are mixed and pumped through a heater and to a reactor in which the mixture is contacted with a hydrogenation catalyst which is suspended in the reaction mixture. Both feed and products are handled in mixed phase, with the attendant difficulties in pumping such a mixture, and a somewhat complicated system involving a plurality of lock chambers is required to recover catalyst from the reactor for regeneration.

It is an object of this invention to provide a continuous process for the hydrogenation of petroleum fractions in liquid phase in the presence of a suspended hydrogenation catalyst, and in the presence of sufficient hydrogen to substantially inhibit coking of the catalyst.

In accordance with the present invention, the oil to be treated and hydrogen are separately introduced to a reactor which is equipped with an open-ended vertical draft tube. The oil, containing a small amount of catalyst, is introduced into the reactor through eductor nozzles at a point below the draft tube, while the hydrogen is introduced through eductor nozzles within the draft tube. The oil eductor nozzles pick up a slurry of recycle oil and catalyst from the bottom portion of the reactor and inject it into the lower portion of the draft tube, where it mixes with the hydrogen and is carried upward through the draft tube in turbulent flow, at a speed greater than the settling rate of the catalyst. At the upper end of the draft tube the liquid is separated from the gas, and moves outwardly into an annular downflow zone which surrounds the draft tube, while the gas is taken off at a point above the liquid level in the reactor. In its downward movement through the downflow zone, the liquid will pass a catalyst-disengaging zone formed by an annular baffle running around the inside of the wall of the reactor. A portion of the product which will contain only a small amount of catalyst fines, is removed from the catalyst-disengaging zone at a point near the top thereof, while a second portion of product, containing catalyst in the same catalyst-to-oil ratio as is present in the draft tube, is removed from the reactor at a point below the catalyst-disengaging zone. The total amount of product and catalyst withdrawn through the two product lines will be equivalent to the feed and catalyst introduced into the reactor. However, since one of the product streams will contain only a small amount of catalyst fines, it is possible to maintain a much higher catalyst to oil ratio in the interior of the reactor than exists in the feed or the product.

The material flowing downwardly through the downflow zone, with the exception of that taken off through the two product lines, collects in the bottom of the reactor, from which it is picked up by the feed eductor nozzles for repassage through the draft tube. Preferably, conditions are maintained within the reactor such that the ratio of recycle material to feed is within the range of 1:1 to 50:1, and preferably from 5:1 to 15:1. This may be obtained by proper design of the eductor nozzles to yield a speed of circulation through the draft tube and downflow zone which will give the desired ratio. In the event that it is desired to operate the unit at feed rates greater or lesser than the designed rate, the recycle ratio may be maintained by varying the hydrogen flow rate to regulate the velocity within the draft tube, and consequently the circulation rate of the recycle material.

The internal recycle, which is of the essence of the present invention, presents three important advantages. First, even in a moderate sized reactor, there will be sufficient average residence time of the feed within the reactor to effect the desired degree of conversion at high ratios of hydrogen to feed and consequent high velocity in the conversion zone, whereas, in a once-through operation, such as that shown in the Joyce patent discussed above, the reactor volume, per unit of charge, must be very large to provide the required residence time. A second, even more important advantage, in the case of exothermic reactions such as hydrogenation, is temperature control. In the case of a once-through operation, the feed must be preheated to reaction temperature prior to its introduction to the reactor. In order to prevent a run-away temperature rise, indirect heat exchange means are customarily employed to absorb the heat of reaction. Such cooling means are relatively inefficient, and there is always the danger of the development of local hot spots, leading to thermal decomposition of the feed.

In accordance with the present invention, however, the feed need not be heated to reaction temperature prior to its introduction to the reactor, since a large part of the heat required will be supplied by the recycle stream. Simultaneously, the recycle stream will be cooled by the relatively cool feed, so that excessive temperatures in the reactor may be positively avoided.

A third advantage of the internal recycle is the ability to maintain catalyst withdrawal at any rate required to achieve the desired catalyst activity, while still maintaining the desired catalyst-oil ratio in the reaction zone. With the ability to maintain very high hydrogen-oil ratios, the rate of catalyst deactivation will be very low. Hence the catalyst removal rate would be correspondingly low and in some instances the attrition rate will control, thus greatly reducing the catalyst handling facilities required.

In order that the invention may be fully understood by those skilled in the art, it will be more particularly described in connection with the accompanying drawings, in which:

Fig. 1 is a diagrammatic flow sheet of a process conducted according to the invention; and Fig. 2 is a vertical cross-sectional view of a reactor adapted for use in practicing the invention.

Referring more particularly to Fig. 1, in starting up the process a high boiling hydrocarbon feed is introduced through line 10 and is mixed with a slurry of hydrogenation catalyst particles suspended in oil, which may be of the same character as the feed, from line 11. The amount of catalyst admixed with feed will vary considerably depending upon the activity of the catalyst, and the severity of reaction conditions, but, in general, the oil to catalyst ratio should be from about 2:1 to about 20:1, although in some instances ratios outside this range may be employed. By hydrogenation catalyst we mean any of the catalysts commonly used in the hydrogenation or hydrodesulfurization of petroleum fractions, such as Group VI oxides or sulfides, either alone or in combination with iron group compounds. The catalyst may be co-precipitated with, or distended upon a support such as alumina, silica-alumina, or naturally occurring clays. A preferred catalyst is cobalt molybdate distended on alumina, the cobalt molybdate comprising about 13% by weight of the composition, although other known catalysts, such as 2% molybdena on alumina may also be used.

The mixture of oil and catalyst is then passed through heater 12 in which it is heated to reaction temperature, which may vary from about 600° F. to 1000° F. or over depending on the degree of conversion desired, but in any event somewhat lower than the temperature at which thermal decomposition of the feed will take place. From heater 10 the mixture is passed through line 13 to reactor 14, which is maintained at an elevated pressure of from 500 to 5,000 p.s.i.g., until the latter is about one-half filled. At this time, flow of hydrogen to reactor 14 is started through line 16, and the temperature of heater 12 is lowered in order to maintain the feed temperature at a point such that the heat imparted to the feed by heater 12 plus the exothermic heat of reaction in reactor 14 will maintain the desired reaction temperature.

As may be seen by reference to Fig. 2, reactor 14 consists of a shell 17 having top and bottom closure plates 18 and 19, respectively. An open-ended draft tube 20 is disposed preferably centrally in shell 17, and is fixed in place as by spiders 21. Feed line 13 passes upwardly through closure plate 18, and terminates at distributor 22, which is provided with eductor nozzles 23, located below the end of draft tube 20. Hydrogen line 16 likewise passes through closure plate 18, and terminates in distributor 24, which is provided with eductor nozzles 25, and which is located within draft tube 20 at a point slightly above the lower end thereof.

Returning now to a description of the process, when flow of hydrogen through line 16 is commenced, the liquid level in the reactor will be above eductor nozzles 25. Flow of hydrogen through nozzles 25 will provide a jet action sufficient to force liquid up through draft tube 20 at a speed above the settling rate of the catalyst in the oil. It will be understood, of course, that the amount of jet action needed for this result will depend on the design of the eductor and the volume ratio of hydrogen to liquid in the draft tube. In general, it has been found that if the catalyst is in pellets of 1 mm. diameter, with properly designed eductor nozzles, an actual volume ratio of gas to liquid as low as 1:2 will suffice, but higher ratios, such as 1:1 to 5:1 are preferred, since higher ratios will promote greater turbulence in the draft tube, with consequent faster diffusion of hydrogen to the catalyst surface. When the mixture of hydrocarbons and suspended catalyst reaches the top of draft tube 20 it will pass into gas-liquid separation zone 26, in which the gas becomes disengaged from the liquid, and passes out of reactor 14 via gas outlet line 27. A portion of the off-gas is recycled to line 16 via line 29, under the control of proportioning valve 30, while the remainder is bled from the system through line 31, in order to avoid build-up of gaseous reaction products in the recycle gas. The liquid and catalyst will flow outwardly from the top of draft tube 20 in the manner indicated by the arrows, and will pass downwardly through downflow zone 27 to the bottom of reactor 14, from which it is picked up by eductor nozzles 23 for reinjection into the draft tube.

Operation will be continued in the above described manner until the liquid level in the reactor reaches the level indicated by dotted line 35, at which time draw-off of product through product lines 36 and 37, under the control of valves 38 and 39 will commence. As will be noted from Fig. 2, reactor 14 is provided with an annular baffle 40, near the upper end thereof, baffle 40 being held in place by spider 41. The upper end of baffle 40 projects above liquid level 35, and the lower end projects downwardly below the upper end of draft tube 20. The upper portion of baffle 40 is of greater diameter than the lower portion thereof, and approaches shell 17 closely, leaving a small clearance 42 to permit any gas trapped between baffle 40 and shell 16 to escape into separation zone 26. The lower portion of baffle 40 of reduced diameter, to form a catalyst separation zone 43 between baffle 40 and shell 17. Product line 36 connects with reactor 14 at a point near the upper end of zone 43, while product line 37 connects with reactor 14 below baffle 40. As product withdrawal is commenced, liquid will flow upwardly from downflow zone 27 into catalyst separation zone 43, at a velocity low enough to permit catalyst to settle back into downflow zone 27, and will be withdrawn from reactor 14 through product line 36. The liquid withdrawn through line 36 will be substantially catalyst-free during the early on-stream period, but after the process has been on-stream for a period of time, catalyst fines resulting from attrition of the catalyst will appear in this stream. The product withdrawn through line 37 will contain catalyst in substantially the same catalyst-oil ratio as in reactor 14. Valves 38 and 39 are so controlled that the amount of product withdrawn is equivalent to the amount of fresh feed introduced to the reactor, and the amount of catalyst in the withdrawn product is the amount which, when regenerated and returned to the reactor, will maintain an equilibrium catalyst activity. The actual amount will vary widely depending on severity of operating conditions, type of catalyst, and coke-forming tendencies of the feed stock, but, in general, the product stream will contain from about 0.1% to about 2% by volume of catalyst. Simultaneously with the commencement of product withdrawal, introduction of catalyst through line 11 will be reduced to the same amount withdrawn with the product in order to maintain a constant catalyst/oil ratio in reactor 14.

The product streams from lines 36 and 37 are combined and are passed through pressure reducing valve 44 to gas-liquid cyclone 45 maintained at atmospheric pressure, from which gases dissolved in the liquid at the pressure prevailing in reactor 14, are taken off through line 46. A slurry of catalyst in oil is removed from cyclone 45 via line 47 and is passed to a liquid-solid cyclone 48, in which the bulk of the catalyst is separated from the oil. Oil containing a small amount of catalyst is removed from cyclone 48 and is passed through line 49 to settler 50, in which the remaining catalyst is settled out, a catalyst-free product being withdrawn to storage through line 51. Catalyst recovered from cyclone 48 through line 52 is combined with catalyst recovered from settler 50 through line 53, and the catalyst mud, which contains a considerable quantity of oil, is passed to pressure filter 54 where the bulk of the oil is removed and passed to storage through line 55. Catalyst from filter 54 is picked up by screw conveyor 56, and is passed through line 57 to regenerator 58, in which carbonaceous deposits are burned off the catalyst in order to recondition it for recycle to reactor 14. Regeneration air is supplied to regenerator 58 through line 59, in admixture with sufficient recycle flue gas from line 60 to reduce the oxygen content to a value such as to avoid overheating of the catalyst during regeneration. Cooler 61 in line 60 is provided to cool the recycle flue gas. Excess flue gas is vented through line 62.

Regenerated catalyst is passed from regenerator 58 to catalyst hopper 63, which serves as intermediate catalyst storage. From hopper 63, catalyst, in volume equal to that withdrawn from reactor 14 with the product stream, is continuously passed to mixer 64 in which it is mixed with a sufficient amount of oil from line 65 to form a pumpable slurry. The slurry is then sent through line 66 to admixture with incoming feed in line 10. When the first recycle catalyst hits line 10, addition of catalyst through line 11 will be discontinued.

After the process has been on stream some time, catalyst fines will begin to appear in the product stream withdrawn through line 36. When this happens, the volume of product withdrawn through line 37 will be reduced, in order not to withdraw an excessive amount of catalyst from the reactor. Eventually, due to attrition, the amount of catalyst fines in the system will build up to a point such that the major portion of the catalyst is withdrawn through line 36. At this time, a portion of the catalyst recovered from filter 54 will be discarded through line 67. Fresh catalyst may be added through line 68 to catalyst hopper 63 from time to time as may be required to make up for that discarded. By so proceeding, the amount of catalyst fines in the system may be held at a constant value in order to keep the process in a truly steady state.

It will be appreciated by those skilled in the art that various pumps, heat exchangers and other process equipment are used in the process which are not shown in the drawings or specifically described. Since such equipment is standard, and no novelty is predicated on the use thereof, it is felt that discussion and illustration of the equipment is not warranted.

As a specific example of a process according to the present invention, a plant for hydrodesulfurizing 12,000 barrels per day of a heavy crude residuum boiling above 800° F., and containing 5% sulfur is operated under the following conditions. The reactor 14 has an overall height of 26 feet and a diameter of 7 feet. Draft tube 20 is 20 feet high and 4 feet in diameter, while clearance 42 is one inch wide and catalyst settling zone 43 is eight inches wide and three feet deep. Operational data for a process yielding a product containing less than 0.5% sulfur is given in the following table, in which all values are in units per barrel of charge oil.

*Table I*

|  | Liquid Phase | | | | Gas Phase | |
|---|---|---|---|---|---|---|
|  | Oil, Actual Ft.$^3$ | Catalyst, Actual Ft.$^3$ | $H_2$, s.c.f. | $H_2S$, s.c.f. | $H_2$, s.c.f. | $H_2S$, s.c.f. |
| Raw feed from line 10 | 7.43 |  |  |  |  |  |
| Catalyst slurry from line 66 | 0.07 | 0.017 |  |  |  |  |
| Make up $H_2$ from line 16 |  |  |  |  | 2,270 |  |
| Recycle gas from line 29 |  |  |  |  | 1,463 | 627 |
| Treated oil out through 36 and 37 | 7.5 | 0.017 | 64.6 | 141.7 |  |  |
| Gas vented through line 31 |  |  |  |  | 602.7 | 258.3 |
| Mixture in draft tube 20 | 82.5 | 10.2 | 710.6 | 1,558 | 2,066 | 885 |
| Recycle oil in bottom of reactor | 75.0 | 10.18 | 646 | 1,416 |  |  |

Temperature—800° F.
Pressure—1500 p.s.i.g.
Catalyst—1 mm. x 1 mm. cylindrical pellets; 13% cobalt molybdate on alumina; density 1.76.
Velocity of upflowing mixture in draft tube 20—20 feet per second.

The invention claimed is:

1. An apparatus for contacting liquids with gases which comprises a shell, upper and lower closure plates, a vertical, open-ended draft tube disposed centrally in the shell, a liquid inlet line passing through the lower closure plate, a liquid eduction nozzle associated with said liquid inlet line, said eduction nozzle being located below said draft tube, a gas inlet line passing through the lower closure plate, a gas eduction nozzle associated with said gas inlet line, said gas eduction nozzle being located within said draft tube, a gas outlet line passing through the upper closure plate, an inwardly and downwardly extending baffle associated with the inner wall of said shell, the bottom of said baffle lying below the top of the draft tube, a first product outlet line passing through the shell adjacent said baffle, and a second product line passing through the shell at a point spaced from said baffle and below the top of the draft tube, and valve means associated with each of said product lines for controlling flow therethrough.

2. A process for reacting heavy petroleum fractions with hydrogen which comprises maintaining a circulating stream of heavy hydrocarbon oil and suspended particulate hydrogenation catalyst under hydrogenation conditions of temperature and pressure within a confined reaction zone, passing the oil and catalyst including the largest catalyst particles in successive cycles through an upflow path and a separate annular downflow path surrounding the upflow path, continuously introducing into said circulating stream additional heavy hydrocarbon oil, catalyst, and hydrogen, passing oil and catalyst upwardly through the upflow path at a speed greater than the settling rate of the catalyst, continuously separating hydrogen from said circulating stream, continuously separating from said circulating stream a first oil product stream containing catalyst in a lesser proportion of catalyst to oil than is present in the circulating stream and continuously withdrawing from the circulating stream a second oil product stream containing catalyst in the same proportion of catalyst to oil as is present in the circulating stream, the total quantity of oil and catalyst in the two oil product streams being equivalent to the quantity of oil and catalyst which is continuously introduced into said circulating stream.

3. The process according to claim 2 in which the circulating stream is caused to move, in succession, upwardly, outwardly, downwardly, and inwardly within the confined reaction zone, the additional heavy hydrocarbon oil, catalyst, and hydrogen are introduced to the circulating stream at the beginning of its upward movement, the hydrogen is separated from the circulating stream at the end of its upward movement, and both oil product streams are removed from the circulating stream during its downward movement.

References Cited in the file of this patent

UNITED STATES PATENTS

| | | |
|---|---|---|
| 1,405,126 | Harris | Jan. 31, 1922 |
| 1,566,008 | Hinrichs | Dec. 15, 1925 |
| 2,700,015 | Joyce | Jan. 18, 1955 |
| 2,706,167 | Harper et al. | Apr. 12, 1955 |
| 2,720,447 | Jones et al. | Oct. 11, 1955 |
| 2,723,943 | McAfee | Nov. 15, 1955 |